(12) United States Patent
Stallo et al.

(10) Patent No.: US 7,770,148 B2
(45) Date of Patent: Aug. 3, 2010

(54) METHODS AND APPARATUS ENABLING DIAGRAM CUSTOMIZATION RETENTION

(75) Inventors: Giovanni Stallo, Redmond, WA (US); Jeremy E. Mercer, Woodinville, WA (US); Ramesh Rajagopal, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/137,247

(22) Filed: May 25, 2005

(65) Prior Publication Data

US 2006/0266250 A1     Nov. 30, 2006

(51) Int. Cl.
*G06F 9/44* (2006.01)
(52) U.S. Cl. .................. 717/107; 717/108; 717/109; 717/116; 717/117
(58) Field of Classification Search .......... None
See application file for complete search history.

(56) References Cited

U.S. PATENT DOCUMENTS

| | | | |
|---|---|---|---|
| 5,736,908 A | 4/1998 | Alexanian | |
| 5,920,240 A | 7/1999 | Alexanian | |
| 6,028,483 A | 2/2000 | Shealy | |
| 6,686,875 B1 | 2/2004 | Wolfson | |
| 6,826,748 B1 * | 11/2004 | Hohensee et al. | 717/130 |
| 7,137,110 B1 * | 11/2006 | Reese et al. | 717/158 |
| 2006/0053414 A1 * | 3/2006 | Bhandari et al. | 717/133 |

* cited by examiner

*Primary Examiner*—Chuck O Kendall
(74) *Attorney, Agent, or Firm*—Wolf, Greenfield & Sacks, P.C.

(57) ABSTRACT

In one embodiment, a method is provided for use in a system in which a user may edit an artifact and a diagram representing the artifact. The method includes acts of temporarily removing, in response to a request by the user, an artifact portion which corresponds to a diagram element on a diagram (e.g., a class diagram); removing the diagram element from the diagram; replacing, in response to a request by the user, the artifact portion in the artifact; and replacing the diagram element in the diagram, wherein the diagram element retains at least a portion of customization performed by the user previous to its removal from the diagram. In one embodiment, the method includes creating a representation of the diagram element which provides an indication of the customization performed by the user, storing the representation in a data structure when the artifact portion is temporarily removed, and retrieving the representation from the data structure to recreate the diagram element when the artifact portion is replaced.

17 Claims, 6 Drawing Sheets

METHODS AND APPARATUS ENABLING DIAGRAM CUSTOMIZATION RETENTION

FIELD OF THE INVENTION

This invention relates to computer software, and more particularly to methods and apparatus used to develop software.

BACKGROUND OF THE INVENTION

Many software development tools allow users to view a diagrammatic representation of coded entities and maintain synchronization between the diagrammatic representation and the underlying entities. For example, class diagramming tools allow users to draw a diagram which displays characteristics of classes in an object-oriented system and relationships between classes, to help design and describe the system. Many class diagramming tools support "forward generation," which enables diagram elements to be used to generate code structures and/or other artifacts. Many class diagramming tools also support the inverse operation, "reverse engineering," whereby code structures and other artifacts are converted into diagram elements. Some tools perform forward generation and reverse engineering in an automated manner, such that code artifacts and design elements are continuously synchronized. This technique may ensure that a class diagram provides an accurate visual representation of current code artifacts.

Figure 1A:
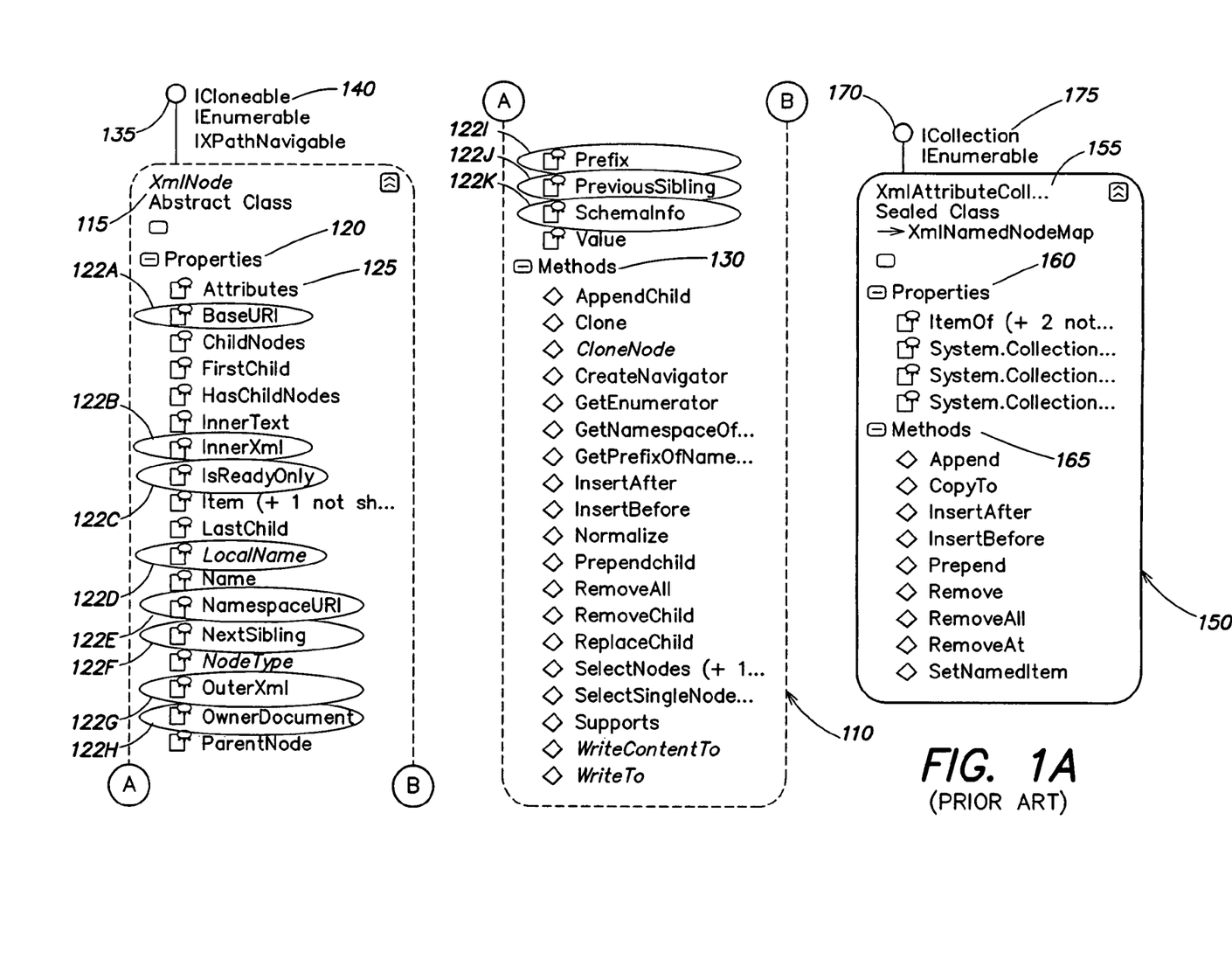
FIG. 1A depicts elements of a class diagram before exemplary user customization, according to the prior art.

Exemplary elements of a class diagram are shown in FIG. 1A. Specifically, FIG. 1A includes class diagram elements 110, 120, representing the classes "XMLNode" and "XMLAttributeCollection" (as indicated by class names 115 and 155, respectively). Element 110 includes properties indicator 120 and methods indicator 130, each of which are shown in maximized form (denoted by the "-" to the left of each indicator), such that individual properties and methods of the class are displayed in list form to the user. As an example, the properties of the "XMLNode" class include "attributes" (denoted by attributes indicator 125) and various property indicators having reference characters 122A-122K. Element 110 also includes icon 135, which indicates that the considered class implements the interfaces shown. As an example, interface name 140 ("ICloneable") is an interface implemented by the "XMLNode" class represented by diagram element 110.

Diagram element 150 is characterized by similar features. For example, diagram element 150 includes class name 155, properties indicator 160 which shows properties of the class in list form, methods indicator 165 which shows methods of the class in list form, and icon 170 which shows the interfaces implemented by the considered class.

Conventionally, much of the effort expended by a user to create a class diagram is spent tailoring the visual characteristics of diagram elements. Customization of diagram elements may include adjusting the number and relative positions of diagram elements, whether certain of the diagram elements are visible or hidden, associations between diagram elements (including endpoints and line routing), and/or other customization.

Figure 1B:
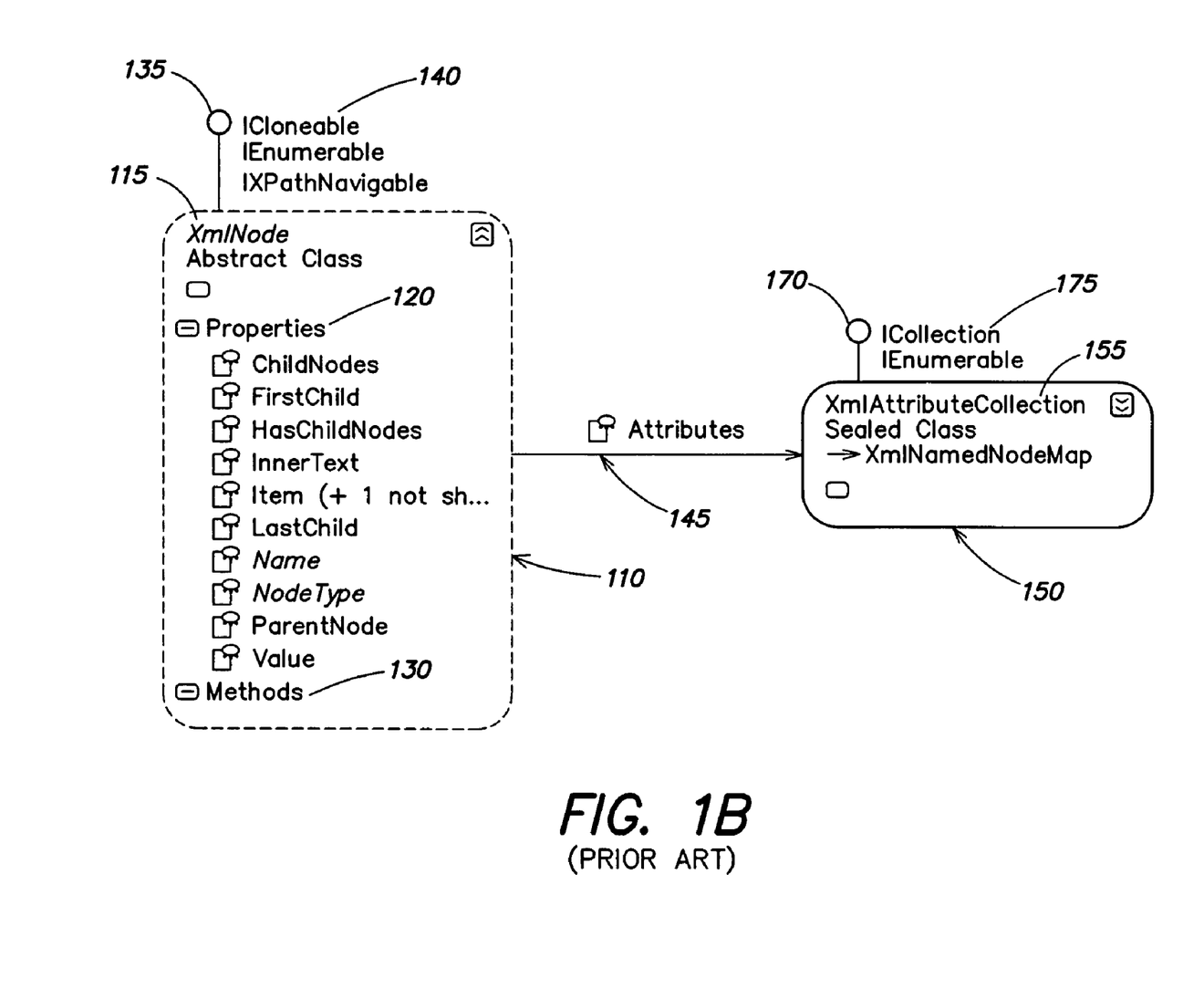
FIG. 1B depicts elements of a class diagram after exemplary user customization, according to the prior art.

FIG. 1B illustrates some of the customization which a user may perform to the class diagram of FIG. 1A. In FIG. 1B, methods indicator 130 has been changed to minimized form (denoted by the "+"), such that individual methods of the class are not shown. Properties indicator 120 continues to be shown in maximized form, but several of the individual properties in the underlying listing have been changed. Specifically, properties 122A-122K have been removed from the listing, and the attributes property indicator 125 has been removed and replaced by association indicator 145, which provides that the class "XMLNode" represented by diagram element 110 takes its attributes from the class "XMLAttributeCollection" represented by diagram element 150. Also, the width of element 150 has been increased so that the entire class name 155 is visible to the user, and properties indicator 160 and methods indicator 165 visible in FIG. 1A are hidden. Of course, numerous forms of customization other than those illustrated above could be performed to a class diagram. For example, a user may simplify a class diagram by specifying that only a portion of the total classes present in the underlying code should be visible.

SUMMARY OF THE INVENTION

In accordance with one embodiment, a method is provided for use in a system in which a user may edit an artifact and a diagram representing the artifact, the diagram including at least one diagram element, each diagram element representing a portion of the artifact on the diagram, the diagram and the artifact being synchronized such that the at least one diagram element represents a current state of a respective artifact portion on the diagram, a first diagram element of the at least one diagram element reflecting a customization performed previously by the user. The method includes acts of: (A) temporarily removing, in response to a request by the user, a first artifact portion, the first artifact portion corresponding to the first diagram element; (B) removing the first diagram element from the diagram; (C) replacing, in response to a request by the user, the first artifact portion in the artifact; and (D) replacing the first diagram element in the diagram, wherein the first diagram element retains at least a portion of the customization performed previously by the user.

In another embodiment, at least one computer-readable medium is provided for use in a system in which a user may edit an artifact and a diagram representing the artifact, the diagram including at least one diagram element, each diagram element representing a portion of the artifact on the diagram, the diagram and the artifact being synchronized such that the at least one diagram element represents a current state of a respective artifact portion on the diagram, a first diagram element of the at least one diagram element reflecting a customization performed previously by the user. The at least one computer-readable medium has instructions recorded thereon which, when executed, perform a method including acts of: (A) temporarily removing, in response to a request by the user, a first artifact portion, the first artifact portion corresponding to the first diagram element; (B) removing the first diagram element from the diagram; (C) replacing, in response to a request by the user, the first artifact portion in the artifact; and (D) replacing the first diagram element in the diagram, wherein the first diagram element retains at least a portion of the customization performed previously by the user.

BRIEF DESCRIPTION OF THE DRAWINGS

The accompanying drawings are not intended to be drawn to scale. In the drawings, each identical or nearly identical component illustrated in the various figures are represented by a like numeral. For purposes of clarity, not every component may be labeled in every drawing. In the drawings.

DETAILED DESCRIPTION

Applicants have appreciated that when a user employs a software development tool which enables the user to view a diagrammatic representation of an underlying code artifact and which maintains synchronization between the diagrammatic representation and the artifact, it is common for the user to temporarily remove portions of code. For example, a user may wish to move a portion of code to a new location, and may execute a "cut" operation (as part of a "cut and paste" editing sequence) which temporarily removes the code portion from the artifact. With tools that automatically synchronize a diagram and its underlying code, temporarily removing a code portion from an artifact can cause one or more corresponding diagram elements to be removed from the diagram as well. Although the user may execute a "paste" operation to replace the code (e.g., in a new location), the corresponding diagram element(s) may not be replaced on the diagram, or may not retain any of the customization which the user had performed on the diagram element before it was removed. As a result, user effort which is expended to customize the diagram element(s) is lost.

Accordingly, one embodiment of the invention includes a method whereby a diagram element may survive a temporary removal of code portions which the diagram element represents. In one embodiment, the method includes monitoring user edit operations to determine whether a code portion is removed. If so, a representation for each diagram element which corresponds to the code portion may be created and stored in a data structure. When the code portion is replaced in the artifact, if it is recognized as a portion that was previously removed, the representation of each corresponding diagram element corresponding to the code portion may be retrieved from the data structure, and each diagram element may be recreated from its representation and replaced in the diagram.

A representation of a diagram element may include, for example, one or more data elements which define various characteristics of the diagram element. For example, the visual characteristics of a diagram element may be represented, such that customization performed by the user on the diagram element may be preserved when the diagram element is replaced in the diagram. Visual characteristics of a diagram element may include the diagram element's position on the diagram, width, hidden or visible state, expanded or collapsed state, the expanded or collapsed state of any of its compartments, its associated icons, and/or associations with other diagram elements. However, any suitable diagram element characteristic may be defined, including visual and/or non-visual characteristics, as the invention is not limited in this respect.

Figure 2:
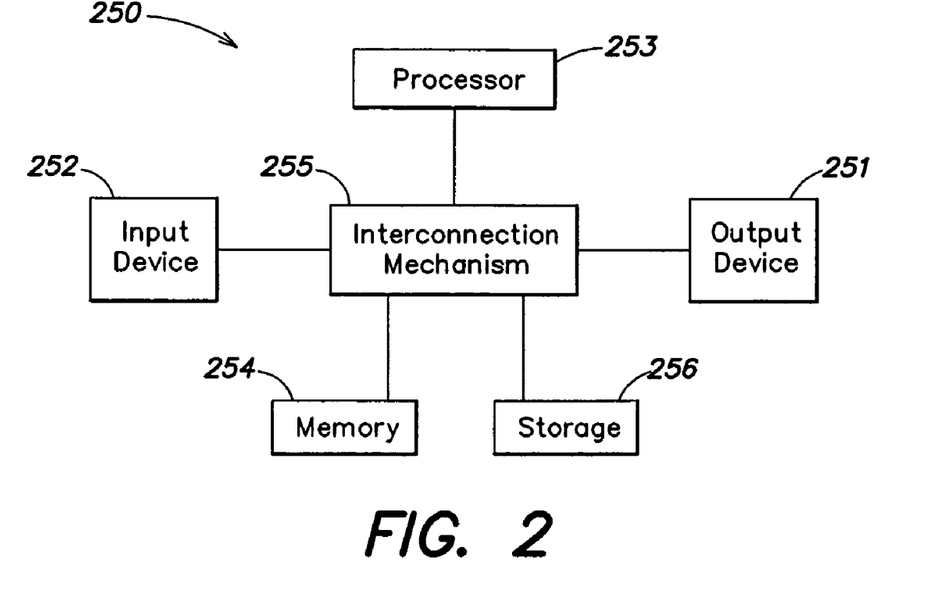
FIG. 2 is a block diagram of an exemplary computer system on which embodiments of the invention may be implemented.

Various aspects of the invention may be implemented on one or more computer systems, such as exemplary computer system 250 shown in FIG. 2. Computer system 250 includes input device(s) 252, output device(s) 251, processor 253, memory system 254, and storage system 256, all of which are coupled, directly or indirectly, via interconnection mechanism 255, which may comprise a bus, switch, another interconnection mechanism, or a combination thereof. Input device(s) 252 may receive input from a user, such as a human operator or another machine, and output device(s) 251 may display or transmit information to a user or machine, such as a liquid crystal display (LCD).

Processor 253 executes a program, called an operating system which controls the execution of other computer programs, and provides scheduling, input/output and other device control, accounting, compilation, storage assignment, data management, memory management, communication and data flow control functions. The processor and operating system collectively define the platform for which application programs and other computer programming languages are written. Processor 253 may execute one or more application programs to implement various functions, such as those which embody aspects of the invention. The programs may be written in a computer programming language, such as a procedural programming language, object-oriented language, macro language, other language, or a combination thereof.

Figure 3:
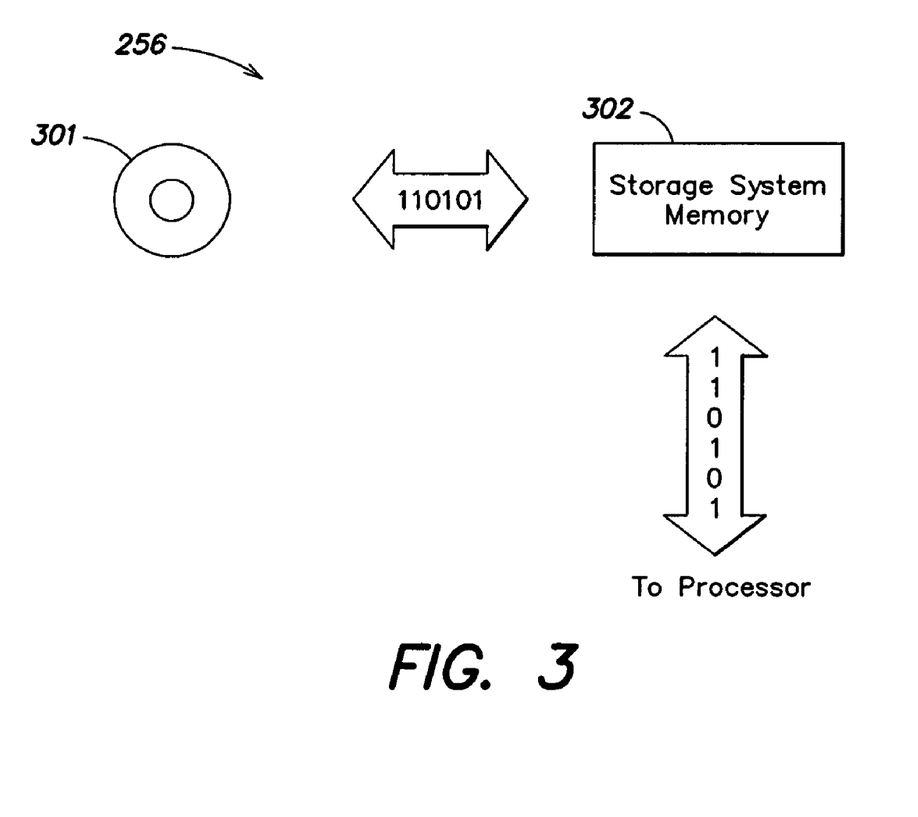
FIG. 3 is a block diagram of a storage system on which embodiments of the invention may be implemented.

The programs may be stored in storage system 256, which may hold information on a volatile and/or non-volatile medium, which may be fixed or removable. Storage system 256 is shown in greater detail in FIG. 3. It typically includes a computer-readable and -writeable non-volatile recording medium 301 on which signals are stored that define a program or information used by the program. The medium may, for example, be disk or flash memory. Typically, in operation, the processor 253 causes data to be read from a non-volatile recording medium 301 into volatile memory 302 (e.g., a random access memory or RAM) that allows for faster access to the information by the processor 253 then does medium 301. Memory 302 may be located in storage system 256, as shown in FIG. 3, or in memory system 254, as shown in FIG. 2. Processor 253 generally manipulates data within the integrated circuit memory 254, 302 and then copies the data to the medium 301 after processing is completed. A variety of mechanisms are known for managing data movement between the medium 301 and the integrated circuit memory element 254, 302, and the invention is not limited thereto. The invention is also not limited to a particular memory system 254, or storage system 256.

Figure 5:
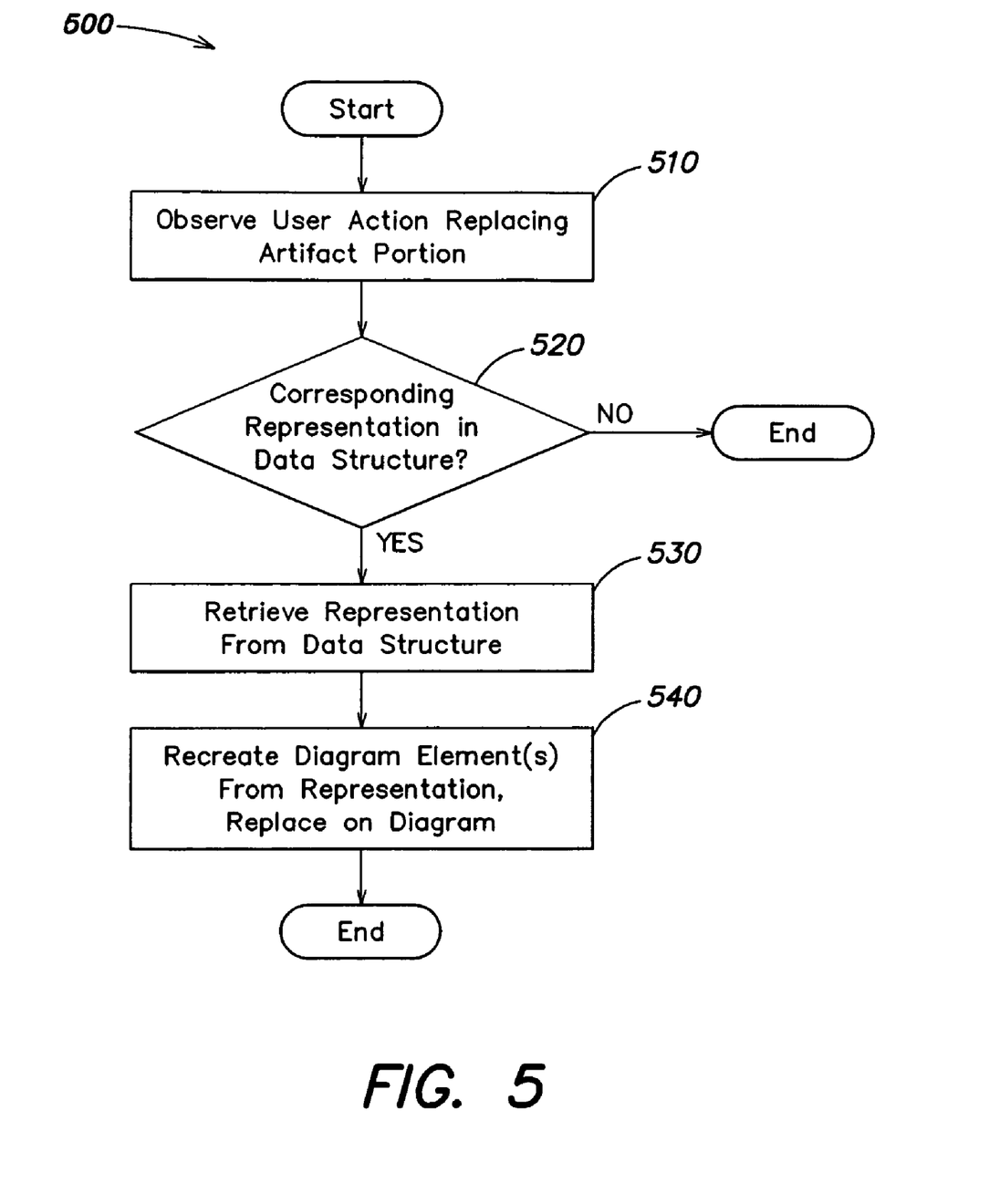
FIG. 5 is a flow chart depicting an exemplary technique for replacing a presentation element in a class diagram, according to embodiments of the invention.
Figure 6A:
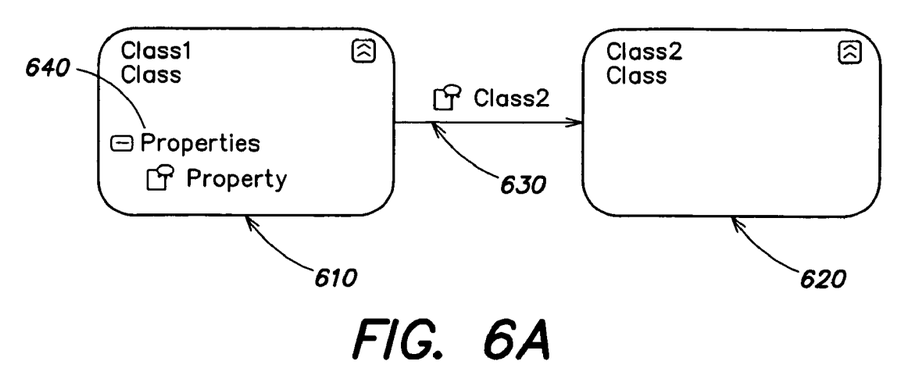
FIG. 6A depicts class diagram elements before a temporary modification to underlying code artifacts, according to embodiments of the invention.
Figure 6B:
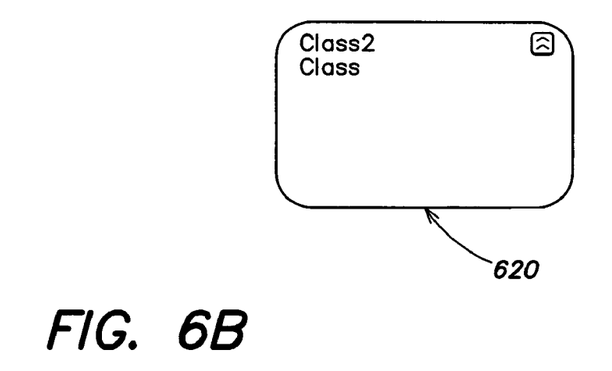
FIG. 6B depicts class diagram elements after a temporary modification to underlying code artifacts, according to embodiments of the invention.
Figure 6C:
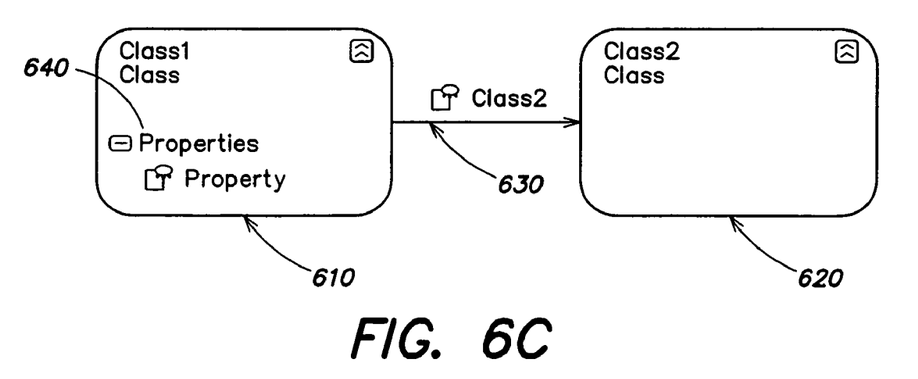
FIG. 6C depicts class diagram elements after an underlying code artifact has been replaced, according to embodiments of the invention.

One or more computer systems, such as computer system 250 (FIG. 2), may be employed to perform techniques in accordance with embodiments of the invention, such as those described below with reference to FIGS. 4, 5 and 6A-6C. Specifically, FIG. 4 depicts an exemplary technique for creating and storing a representation of a diagram element upon the temporary removal of code which the diagram element represents, FIG. 5 shows an exemplary technique for replacing a diagram element in a diagram when a code portion represented by the diagram element is restored in the artifact, and FIGS. 6A-6C depict exemplary diagram elements which may be manipulated according to the techniques of FIGS. 4 and 5.

Figure 4:
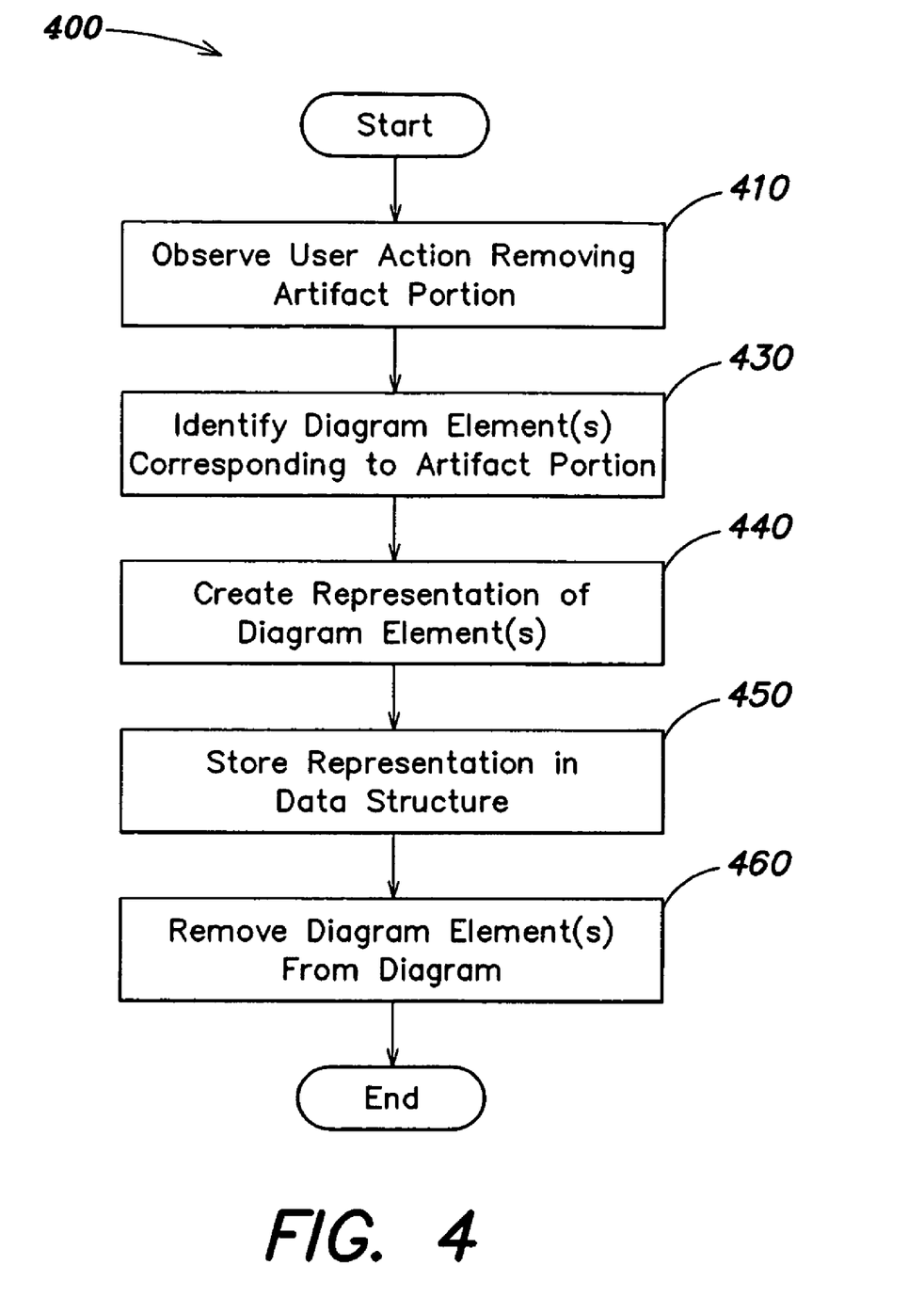
FIG. 4 is a flow chart depicting an exemplary technique for removing a presentation element from a class diagram, according to embodiments of the invention.

Referring first to FIG. 4, upon the start of process 400, a user edit operation which removes a code portion is observed in act 410. Removal of a code portion may be observed in any suitable manner, as the invention is not limited in this respect. As an example, a programmed routine may monitor all user edit operations to determine when a removal of a code portion has occurred.

Removal of code may occur, for example, when a portion of source code is transitioned to an incomplete state, a "cut" operation is performed as part of a cut and paste editing sequence, a "delete" operation is followed by a "undo" operation, a "#if XXX" statement is added before a closing "#endif" statement is added, an opening comment "/*" is added before a closing comment "*/" is added, and/or a block of conditional code is inserted when an associated identifier is not defined. Of course, removal of code is not limited to these particular operations. In one embodiment, a removal of code is distinguishable from a removal of a diagram element which represents the code. For example, a programmed routine which monitors user edit operations may not be configured to recognize the removal of a diagram element as a removal of a code portion in act 410.

In act 430, one or more diagram elements which correspond to the temporarily removed code portion are identified. In this respect, it should be appreciated that a removed code portion may be represented by more than one diagram element. For example, more than one class may be "cut" from a code portion.

Identification of the diagram element(s) which correspond to a code portion may be performed in any of numerous ways. As an example, a diagramming tool may maintain an association between the code portion and the presentation element(s), and this association may be employed to identify the corresponding diagram element(s). However, the invention is not limited in this respect, as any suitable technique may be employed.

The process continues in act 440, wherein a representation for each diagram element identified in act 430 is created. In one embodiment, a representation includes one or more data elements which each provide an indication of a characteristic of the diagram element. However, the invention is not limited in this respect, as a representation may define characteristics in any suitable manner.

Some diagram element characteristics which a representation may include are the diagram element's position on the diagram (e.g., defined in terms of X and Y coordinates), width (e.g., defined by a number of pixels), expanded or collapsed state, the expanded or collapsed state of any of its compartments (e.g., also defined by binary variables), the position and/or expanded or collapsed state of any of its icons, hidden or visible state, the hidden or visible state of any of its compartments, the existence, routing, and/or endpoints of any relationship between the diagram element and another diagram element, and/or any other suitable characteristics. A representation may include any suitable information which is descriptive of a diagram element, or none at all, as the invention is not limited in this respect.

The process continues with act 450, wherein the representation created in act 440 for each diagram element is stored in a data structure. The data structure may take any suitable form, such as a file, database, cache, other data structure, or combination thereof. Further, storage in the data structure may be accomplished in any suitable fashion.

The process continues in act 460, wherein the presentation element(s) corresponding to the code portion are removed from the diagram.

FIGS. 6A and 6B depict the removal of a diagram element corresponding to a removed code portion from a diagram. Specifically, FIG. 6A depicts diagram elements 610 and 620, joined by association indicator 630. Diagram element 610 includes properties indicator 640, displayed in maximized form. As shown in FIG. 6B, upon a determination that diagram element 610 corresponds to a temporarily removed code portion, diagram element 610 and association indicator 630 are removed from the diagram.

Referring again to FIG. 4, upon the completion of act 460, process 400 completes.

FIG. 5 depicts an exemplary process 500 for replacing diagram element(s) in a diagram when a corresponding code portion is replaced. Upon the start of the process, a user editing operation which inserts a code portion is observed in act 510. As with act 410 (FIG. 4), observation of an operation which inserts code may be performed in any suitable way, such as with a programmed routine which monitors user edit operations to determine when an insertion has occurred.

The process proceeds with act 520, wherein it is determined whether the replaced code portion corresponds to a representation of one or more diagram elements stored in the data structure. This determination may be made in any suitable manner. In one exemplary technique which relates to class diagrams, a class name defined by the code portion may be compared to data elements in the data structure which define the class name, and a match drives a determination that a representation for the code portion is stored in the data structure. This an exemplary technique may be advantageous in that special markers, tags and/or other unique identifiers are not inserted into the code to identify and track code portions, such that neither the process nor the code itself needs to account for and manage these identifiers. However, this determination may be made in any suitable fashion, as the invention is not limited in this respect.

If it is determined that the code portion does not correspond to any representation stored in the data structure, the process completes. Otherwise, the process proceeds to act 530.

In act 530, the diagram element representation(s) corresponding to the inserted code portion (i.e., identified in act 520) are retrieved from the data structure. This may be accomplished in any suitable manner. As an example, a query may be executed on the data structure to retrieve the representation(s).

The process continues in act 540, wherein a diagram element is generated from each representation stored in the data structure and implemented in the diagram. This may be performed in any suitable fashion. For example, where a class diagramming tool is employed, the tool may be configured to receive each representation as input and generate and implement the diagram element(s) in the diagram.

One embodiment of an implementation of a diagram element in a diagram is illustrated by FIG. 6C. Specifically, diagram element 610 and association indicator 630 are replaced in the diagram. Diagram element 610 has retained its visual characteristics, including the maximized state of properties indicator 640.

Referring again to FIG. 5, upon the completion of act 540, process 500 completes.

It should be appreciated from the description of exemplary techniques provided above that, in accordance with one embodiment, editing operations which temporarily remove and then replace a code portion need not be sequential. That is, a user need not temporarily remove a code portion and then immediately replace it in order for the diagram element(s) corresponding to the code portion to be replaced in the diagram, as a comparison between the replaced code portion and representations in the data structure need not be performed immediately after the code portion is temporarily removed. Thus, an exemplary scenario which may occur in accordance with one embodiment may include an initial "cut" of a code portion (e.g., from a first file), a completely separate operation (e.g., a creation and naming of a new file), and then a paste of the code portion (e.g., into the new file). In accordance with one embodiment, the diagram element may be replaced in the diagram based on a determination that the replaced code portion corresponds to one or more diagram element representations stored in the data structure.

Further, in one embodiment which represents a variation on the technique described above with reference to FIG. 5, one or more comparisons may be performed between an inserted code portion and a representation stored in the data structure to determine whether the inserted code portion matches the code portion which was initially removed. Upon determining that inserted code portion has a corresponding representation in the data structure (e.g., using the technique performed in act 520), one or more comparisons may be performed between the inserted code and the representation (i.e., serving as a proxy for the code portion which was initially removed). As a result, a diagram element may be created which reflects the inserted code, and not the code which was originally removed (i.e., as characterized by the representation), to the extent they conflict. This technique may, for example, ensure that a diagram element accurately reflects inserted code before it is replaced in the diagram. For example, if the representation in the data structure includes an indication of a property which the inserted code portion does not include, then the diagram element may be created to omit the considered property to accurately represent the inserted code portion. In one embodiment, the diagram element may retain other customization which had been performed by a user before the code was temporarily removed, as characterized by the representation.

It should be appreciated that the processes described above with reference to FIGS. 4 and 5 are merely exemplary, and that any suitable technique(s) or process(es) may be employed to preserve a diagram element throughout the temporary removal and subsequent insertion of a corresponding code portion. Where the processes of FIGS. 4 and/or 5 are performed, acts described above may be performed in any suitable order, as the invention is not limited in this respect.

As discussed above, although aspects of embodiments of the invention are described herein primarily with reference to class diagrams and class diagramming tools, the invention is not limited in this respect. Embodiments of the invention may be employed with any suitable tool which provides a user with a diagrammatic view of an underlying artifact, whether or not the underlying artifact comprises a computer program or routine. As examples, embodiments of the invention may be employed with a database design tool that presents tables and/or other entities diagrammatically, a project management tool which represents tasks or task groups diagrammatically, and/or any other suitable tool(s) or implement(s).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for use in a system in which a user may edit a body of programmed instructions and a diagram representing the body of programmed instructions, the diagram including at least one diagram element, each diagram element representing a portion of the body of programmed instructions on the diagram, the diagram and the body of programmed instructions being synchronized such that the at least one diagram element represents a current state of a respective portion of the body of programmed instructions on the diagram, the apparatus comprising at least one processor programmed to:
(A) customize, in response to a request by the user, a first diagram element of the at least one diagram element, the customization comprising at least one of an adjustment to a position of the first diagram element on the diagram, an adjustment to a width of the first diagram element, an adjustment to a hidden or visible state of the first diagram element, an expansion or collapse of the first diagram element, an expansion or collapse of any compartments of the first diagram element, an expansion or collapse of an icon associated with the first diagram element, and an adjustment to an association between the first diagram element and a second diagram element;
(B) temporarily remove, in response to a request by the user, a first portion of the body of programmed instructions, the first portion corresponding to the first diagram element;
(C) remove the first diagram element from the diagram;
(D) replace, in response to a request by the user, the first portion in the body of programmed instructions;
(E) replace the first diagram element in the diagram; and
(F) retain, in the first diagram element replaced in (E), at least a portion of the customization performed in (A).

2. The apparatus of claim 1, wherein the apparatus is for use in a system in which a user may edit a body of programmed instructions and a class diagram representing the body of programmed instructions.

3. The apparatus of claim 1, wherein the at least one processor is programmed to, in (B): at least one of transition the first artifact portion to an incomplete state, perform a cut operation on the first artifact portion as part of a cut and paste sequence, perform a "delete" operation on the first artifact portion followed by an "undo" operation, add a "#if XXX" statement to the first artifact portion before a "#endif" statement is added, and add an opening comment "/*"to the first artifact portion before a closing comment "*/" is added to the first artifact portion.

4. The apparatus of claim 1, wherein the at least one processor is programmed to, in (C):
(C1) create a representation of the first diagram element, the representation providing an indication of the customization performed previously by the user; and
(C2) store the representation in a data structure;
and wherein the at least one processor is programmed to, in (E):
(E1) determine that the first portion corresponds to the representation stored in the data structure;
(E2) recreate the first diagram element based on the representation; and
(E3) replace the first diagram element in the diagram.

5. The apparatus of claim 4, wherein the representation comprises at least one data element, each of the at least one data elements providing an indication of a characteristic of the first diagram element.

6. The apparatus of claim 4, wherein first portion is a class having a class name, and wherein the at least one processor is programmed to, in (E1), compare the first portion to the representation based on the class name.

7. The apparatus of claim 6, wherein the representation comprises at least one further characteristic of the first diagram element, and wherein the at least one processor is programmed to, in (E1), compare the first portion to the representation based on the at least one further characteristic.

8. The apparatus of claim 7, wherein the at least one processor is programmed to, in (E2), if the first portion does not include the at least one further characteristic, recreate the first diagram element such that it does not reflect the at least one further characteristic.

9. In a system in which a user may edit an artifact and a diagram representing the artifact, the diagram including at least one diagram element, each diagram element representing a portion of the artifact on the diagram, the diagram and the artifact being synchronized such that the at least one diagram element represents a current state of a respective artifact portion on the diagram, at least one computer-readable storage medium having instructions stored thereon, the instructions, when executed, performing a method including:
- (A) customizing, in response to a request by the user, a first diagram element of the at least one diagram element, the customization comprising at least one of an adjustment to a position of the first diagram element on the diagram, an adjustment to a width of the first diagram element, an adjustment to a hidden or visible state of the first diagram element, an expansion or collapse of the first diagram element, an expansion or collapse of any compartments of the first diagram element, an expansion or collapse of an icon associated with the first diagram element, and an adjustment to an association between the first diagram element and a second diagram element;
- (B) temporarily removing, in response to a request by the user, a first artifact portion, the first artifact portion corresponding to the first diagram element;
- (C) removing the first diagram element from the diagram;
- (D) replacing, in response to a request by the user, the first artifact portion in the artifact;
- (E) replacing the first diagram element in the diagram; and
- (F) retaining, in the first diagram element replaced in (E), at least a portion of the customization performed in (A).

10. The at least one computer-readable storage medium of claim 9, wherein the artifact comprises a body of programmed instructions.

11. The at least one computer-readable storage medium of claim 9, wherein the diagram comprises a class diagram.

12. The at least one computer-readable storage medium of claim 9, wherein the act of temporarily removing comprises at least one of transitioning the first artifact portion to an incomplete state, performing a cut operation on the first artifact portion as part of a cut and paste sequence, performing a "delete" operation on the first artifact portion followed by an "undo" operation, adding a "#ifXXX" statement to the first artifact portion before a "#endif" statement is added, and adding an opening comment "/*"to the first artifact portion before a closing comment "*/" is added to the first artifact portion.

13. The at least one computer-readable storage medium of claim 9, wherein the act (C) further comprises:
- (C1) creating a representation of the first diagram element, the representation providing an indication of the customization performed previously by the user; and
- (C2) storing the representation in a data structure;

and wherein act (E) further comprises:
- (E1) determining that the first artifact portion corresponds to the representation stored in the data structure;
- (E2) recreating the first diagram element based on the representation; and
- (E3) replacing the first diagram element in the diagram.

14. The at least one computer-readable storage medium of claim 13, wherein the representation comprises at least one data element, each of the at least one data elements providing an indication of a characteristic of the first diagram element.

15. The at least one computer-readable storage medium of claim 13, wherein first artifact portion is a class having a class name, and wherein the act (E1) further comprises comparing the first artifact portion to the representation based on the class name.

16. The at least one computer-readable storage medium of claim 15, wherein the representation comprises at least one further characteristic of the first diagram element, and wherein the act (E1) further comprises comparing the first artifact portion to the representation based on the at least one further characteristic.

17. The at least one computer-readable storage medium of claim 16, wherein, if the first artifact portion does not include the at least one further characteristic, then the act (E2) comprises recreating the first diagram element such that it does not reflect the at least one further characteristic.

\* \* \* \* \*